July 8, 1952  A. W. ZIEGLER  2,602,872
APPARATUS FOR EQUIPPING CRYSTALS WITH WIRES
Filed Dec. 30, 1948  5 Sheets-Sheet 1

INVENTOR
A. W. ZIEGLER
BY
ATTORNEY

July 8, 1952 A. W. ZIEGLER 2,602,872
APPARATUS FOR EQUIPPING CRYSTALS WITH WIRES
Filed Dec. 30, 1948 5 Sheets-Sheet 3

INVENTOR
A. W. ZIEGLER
BY
ATTORNEY

July 8, 1952 — A. W. ZIEGLER — 2,602,872
APPARATUS FOR EQUIPPING CRYSTALS WITH WIRES
Filed Dec. 30, 1948 — 5 Sheets-Sheet 4

INVENTOR
A. W. ZIEGLER
BY
M. R. McKenney
ATTORNEY

July 8, 1952  A. W. ZIEGLER  2,602,872
APPARATUS FOR EQUIPPING CRYSTALS WITH WIRES
Filed Dec. 30, 1948  5 Sheets-Sheet 5

INVENTOR
A. W. ZIEGLER
BY
ATTORNEY

Patented July 8, 1952

2,602,872

UNITED STATES PATENT OFFICE 2,602,872

APPARATUS FOR EQUIPPING CRYSTALS WITH WIRES

Arthur W. Ziegler, Short Hills, N. J., assignor to Bell Telephone Laboratories, Incorporated, New York, N. Y., a corporation of New York Application December 30, 1948, Serial No. 68,223

19 Claims. (Cl. 219—12)

This invention relates to apparatus for equipping frangible objects with wires and wire connecting parts and more particularly to apparatus suitable for equipping crystals with wires.

An object of the invention is to provide improved apparatus for equipping crystals with plates and securing wires to the plates.

A feature of the invention resides in a plate holding and attaching apparatus operable to equip a crystal with plates in accordance with the invention.

Another feature resides in a wire holding and attaching apparatus operable to mount wires in place on the plates attached to the crystals.

Another feature resides in a movable and heatable head in the plate holding and attaching apparatus.

Another feature resides in a movable and heatable head in the wire holding and attaching apparatus.

In the drawings:

Fig. 3 is a view corresponding to Fig. 2 but with head members in the apparatus tilted to a different position;

Fig. 4 is an enlarged view of portions of two plate-holding heads and a crystal holding jig in the plate holding and attaching apparatus;

Fig. 5 shows the apparatus shown in Fig. 4 but with the heads in position to equip the crystal with the required plates.

Fig. 6 shows a crystal etched preparatory to the attachment of the plates;

Fig. 7 shows the crystal with a plate attached thereto;

Fig. 8 shows a larger crystal with two plates attached on a single face of the crystal;

Fig. 9 is an edge view of a crystal with plates attached;

Fig. 10 is an enlarged edge view, partly in section, of a portion of a crystal with plates mounted on the crystal;

Fig. 10-A is an edge view of one of the plates;

Crystals having piezoelectric properties are often required to be equipped with wires to provide a crystal element suitable for use in an electrical system. The wires provide electrical leads for the crystal and also serve as means for supporting the crystal while still allowing the crystal to vibrate in performing its required function. In some cases the crystal is plate-like in form and each wire is so mounted on the crystal that the wire extends angularly outward from a major flat surface of the crystal. Since the crystal moves in performing its required electrical function, it is a desideratum that any mechanical loading of the crystal by the wires be reduced to a minimum.

A relatively small metal plate and some solder are in some cases used to mount the wire on the crystal. In mounting the wire on the crystal sufficient heat must be applied to melt the solder and it has been found in some cases that when sufficient heat is applied to cause melting of the solder the crystal is subjected to such thermal shock and stress that the crystal becomes fractured in whole or in part and is thereby rendered unfit for the service required.

Crystals made of synthetic material and those within the water soluble class are often found to be quite fragile, and will sometimes be fractured in whole or in part when subjected to a relatively high temperature. For instance, if a crystal is made of ethylene diamine tartrate material and an attempt is made to solder connect a wire to a metal surface on the crystal, it is quite likely that the crystal will be fractured by thermal shock or that the shock will cause small particles from the body of the crystal, thus rendering the crystal unsuitable for the particular use required.

I have found that a crystal of frangible material can be safely equipped with a wire by securing a plate by means of adhesive to the crystal and then solder-connecting the wire to the plate, the layer of adhesive forming not only a means of securing the plate to the crystal but also serving as a thermal shock reducing layer between the plate and the crystal when a wire is being connected by means of solder to the plate on the crystal. In my copending application, Serial No. 68,221, filed December 30, 1948, I have described and claimed a crystal element of this structure and the method of making the crystal element.

The present invention resides in apparatus provided for equipping a crystal with a plate and for mounting a wire on the plate.

Figures 3, 4, 5, 6, 7, 8, 9, 10, 10A:
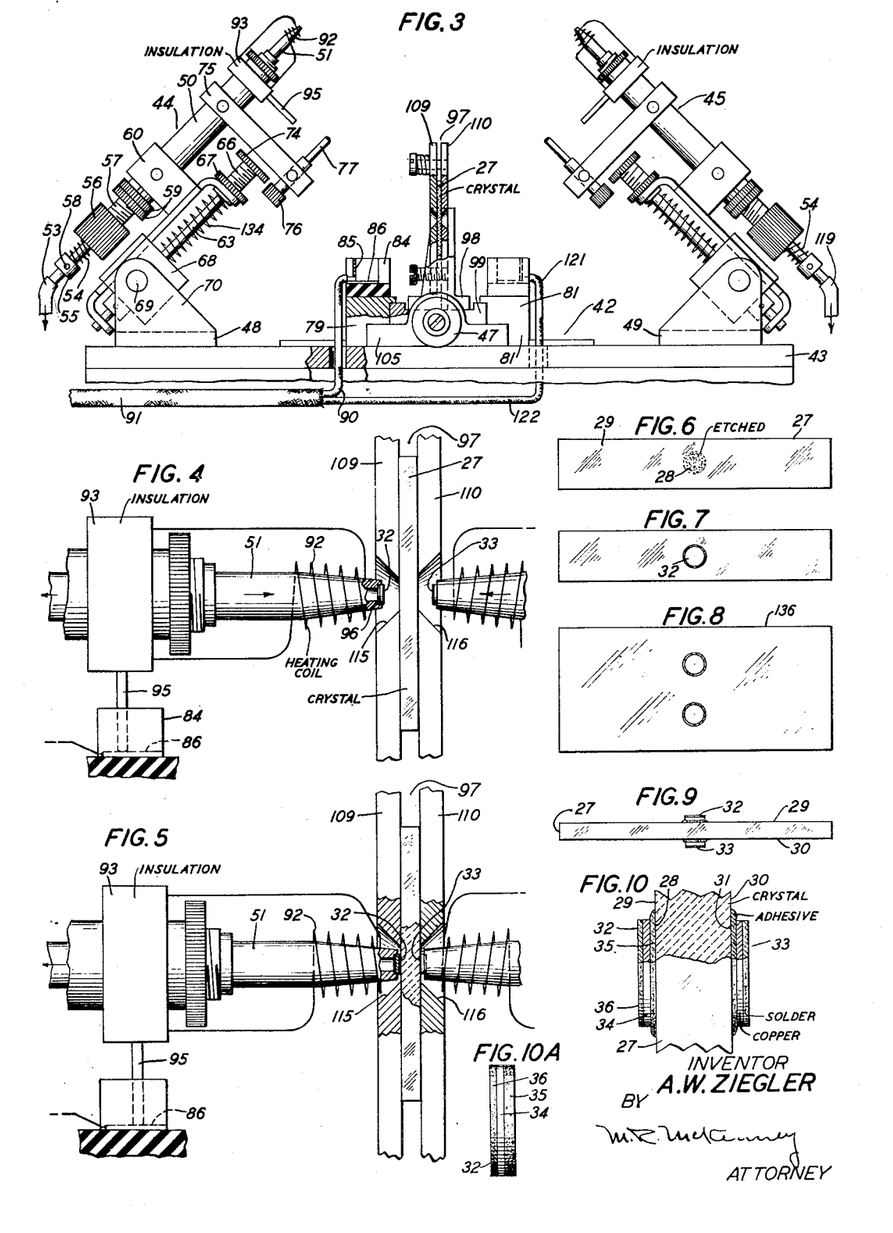
Figure 19:
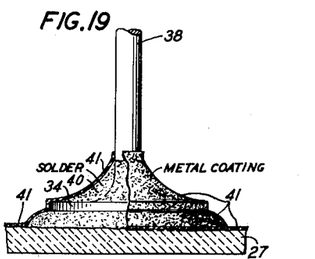
Fig. 19 shows the parts illustrated in Fig. 18 but with a metal coating extending over part of the crystal and over the connection formed between the wire and the plate.
Figures 20, 21, 23, 24, 25:
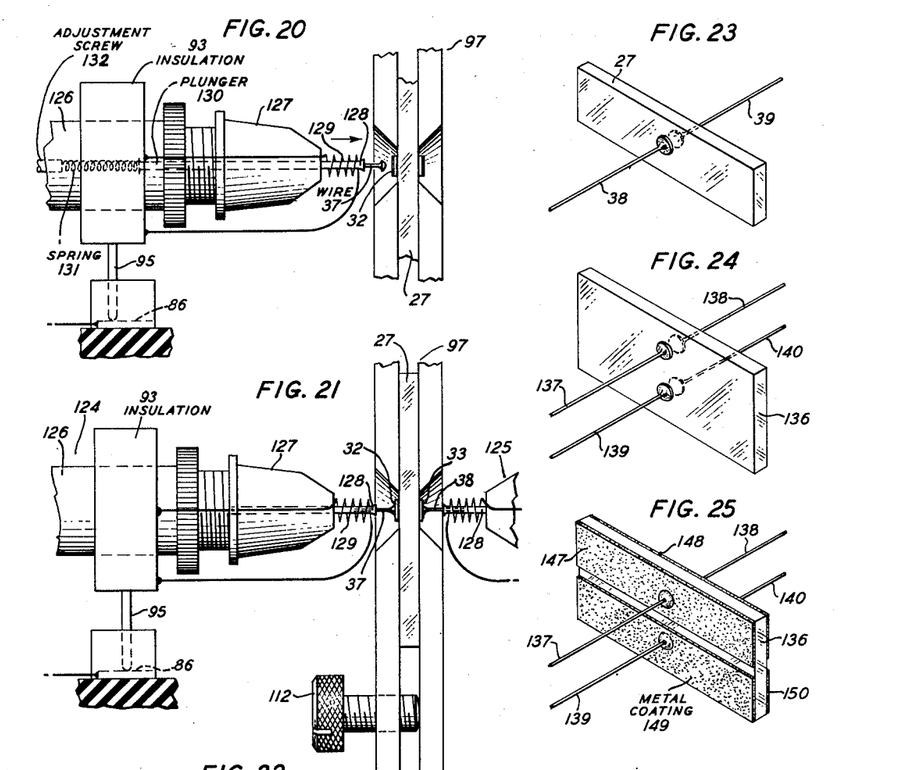
Fig. 20 is an enlarged view of one of the heads in the wire holding and attaching apparatus and shows a portion of the jig and crystal, a wire being supported in the head ready for attachment to a plate on the crystal.
Fig. 21 is a view corresponding to Fig. 20 but with portions of two heads and with the heads moved nearer to the crystal and the wires in attached position on the plates.
Fig. 23 is a view in perspective of a crystal equipped with two wires.
Fig. 24 is a view in perspective of a crystal equipped with four wires.
Fig. 25 shows a crystal equipped with four wires and with metal coatings on major flat surfaces of the crystal, each metal coating extending over a portion of the crystal and over parts of the wire connection.
Figure 26:
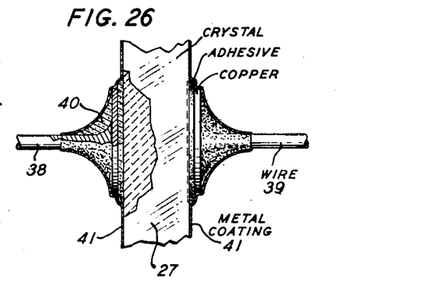
Fig. 26 is an enlarged edge view, partly in section, of a portion of a crystal equipped with wires and with metal coatings extending over portions of the crystal and over parts of the wire connecting structures.

As shown in Fig. 6 the crystal 27 is etched to provide an etched area 28 on a major flat surface 29 of the crystal. The opposite major flat surface 30 of the crystal 27 as shown in Fig. 10 is also etched to provide an etched area 31 in register with and corresponding to the etched area 28 on the major flat surface 29. The etched areas 28 and 31 provide suitable smooth surfaces on the crystal for the securement thereto of plates 32 and 33 respectively shown in Figs. 7, 9 and 10. Each plate 32 and 33 before attachment to the crystal and as shown in Fig. 10A is of laminated construction and comprises a plate 34 of copper or other suitable material and coated on one face with an adhesive 35 and coated on the opposite face with solder 36. The adhesive coating 35 has the property of becoming somewhat soft and tacky when the plate 32 is subjected to a predetermined elevated temperature. By means of the adhesive 35 the plate 32 can be secured to an etched area 28 or 31 on the crystal 27 as required. In Figs. 9 and 10 a plate 32 has been secured to the major flat surface 29 of the crystal 27 and another plate 33, like the plate 32 has been secured to the major flat surface 30 of the crystal 27. After the crystal has been equipped with the plates the crystal can be subjected to a further elevated temperature to cure the adhesive 35. After the plate 32 has been secured to the crystal 27 a wire 37, shown in Fig. 17, can be secured by means of solder to the plate 32 to form a lead wire 38 for the crystal 27 as shown in Fig. 23. After the plate 33 has been secured to the crystal 27 another lead wire 39 for the crystal 27 can be secured by means of solder to the plate 33. During the attachment of a wire to a plate on the crystal a body of solder 40 of frusto-conical form as shown in Fig. 18, is built up over the plate 34 and partway along the wire as will be subsequently more fully described. After the crystal 27 has been equipped with a required lead wire a coating 41 of metal can be formed on a major flat surface of the crystal 27 as shown in Figs. 19 and 26, the coating 41 of metal extending over and into engagement with the body of solder 40 and thus serving as an electrical connection between the surface of the crystal 27 and the lead wire 38.

Plate holding and attaching apparatus

As shown in Figs. 1, 2, 3, 4 and 5 the plate holding and attaching apparatus 42 for equipping a crystal with the required plates, comprises a base 43, movable heating heads 44 and 45 and micrometer-like stems 46 and 47, portions of the heating heads 44 and 45 and portions of the micrometer-like stems 46 and 47 being operable to be moved toward and away from a central portion of the base 43 in accordance with requirements. The heating heads 44 and 45 are pivotally supported in the respective supports 48 and 49 which are spaced apart and secured to the base 43, the supports 48 and 49 extending upwardly from the base 43. The heating heads 44 and 45 are alike in structure and a description and understanding of the structure of the heating head 44 will suffice for an understanding of the structure of the heating head 45.

Figure 1:
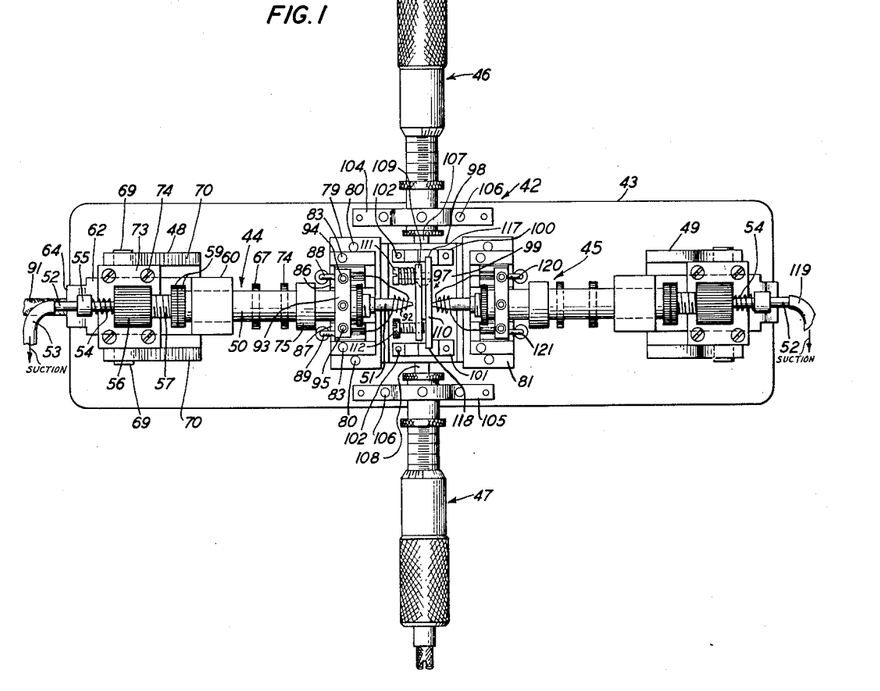
Fig. 1 is a top plan view of the plate holding and attaching apparatus of the invention.
Figure 2:
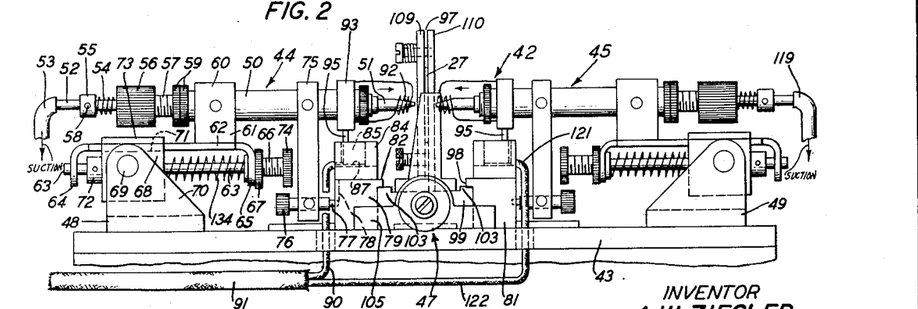
Fig. 2 is a front elevational view of the plate holding and attaching apparatus shown in Fig. 1.

The heating head 44 comprises a tubular body 50 supported in which is a longitudinally movable hollow arm 51 connecting with a longitudinally movable pipe 52 connected to a hose 53 of a pneumatic suction apparatus, not shown. The pipe 52 and the arm 51 project from the body 50 and can be manually moved lengthwise in the body 50 against the action of a return spring 54 supported on the pipe 52 and located between a collar 55 on the pipe 52 and the head portion 56 of a hollow screw 57 having screw threads engaged with one end portion of the body 50. The collar 55 is held in adjusted position on the pipe 52 by means of a set screw 58 which extends through the collar 55 and into engagement with the pipe 52. The hollow screw 57 is equipped with lock nuts 59—59 to hold the hollow screw 57 in adjusted position in the body 50. The body 50 extends through and is supported in a bored block portion 60 of a mounting 61, an apertured and inverted U-shaped body portion 62 of which is equipped with a stem 63 which extends through the apertured leg portions 64 and 65 of the inverted U-shaped body portion 62 of the mounting 61. The leg portion 65 of the inverted U-shaped body portion 62 is apertured to accommodate a threaded portion 66 of the stem 63 and a nut 67 is supported on the threaded portion 66 of the stem 63 to act as a locknut. The stem 63 and the body portion 62 of the mounting 61 extend through a grooved block 68 equipped with trunnions 69—69 which are journaled in apertured spaced walls 70—70 of the support 48. The stem 63 is longitudinally movable in the block 68 as is also the mounting 61; the body portion 62 of the mounting 61 resting in a groove 71 formed in the block 68. A washer 72 is loosely supported on the stem 63. The body portion 62 of the mounting 61 can slide in the grooved block 68 under a cover plate 73 secured by means of screws 74 to the grooved block 68. The stem 63 has a knurled head 74 on one end providing a means by which the stem 63 can be manually held against rotation while the nut 67 is adjusted to a required position to adjust the tension of a spring 134. Secured to and extending downwardly from the body 50 is an apertured arm 75 equipped at its lower end portion with a manually adjustable stop screw 76, an unthreaded end portion 77 of which is arranged to extend into a slot 78 formed in a track bar 79 secured by means of screws 80 to the base 43. The track bar 79 is in spaced relation with a similar track bar 81 and each track bar 79 and 81 is provided with an overhang portion 82 for a purpose to be subsequently explained. Secured on top of the track bar 79 by means of screws 83 is an insulating block 84 in a recess 85 of which are secured terminal plates 86 and 87 to which are respectively connected wires 88 and 89 of a paired and insulatingly covered lead 90 fanned out from a cable 91 which extends under the base 43 and is connected to a suitable source of current supply, not shown.

A heating coil 92 is provided to heat the hollow arm 51 as required. The heating coil 92 is electrically energizable and extends around and in spaced relation with the hollow arm 51 to radiantly heat the hollow arm 51. Ends of the heating coil 92 extend into an apertured terminal block 93 of insulating material mounted on the body 50. Pin-type contacts 94 and 95 are supported in spaced relation in the terminal block 93 and extend downwardly from the terminal block 93 to meet the respective fixed terminal plates 86 and 87 in the insulating block 84 when the head 44 is in the position shown in Figs. 1 and 2. One end of the heating coil 92 is electrically connected to the pin-type contact 94 and the other end is electrically connected to the pin-type contact 95. When the head 44 is in the position shown in Figs. 1 and 2 and electrical current is being supplied by way of the conductors 88 and 89, the heating coil 92 is electrically energized to heat the hollow arm 51. As clearly shown in Fig. 4, the hollow arm 51 has a recess 96 formed in its outer end portion to accommodate a plate 32 to be attached to a crystal 27.

Figure 14:
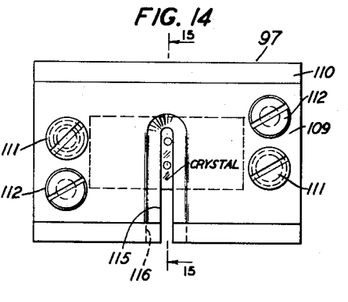
Fig. 14 is a side view of the crystal-holding jig with a crystal therein.
Figure 15:
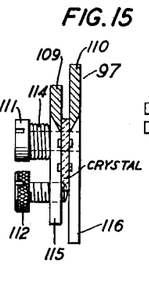
Fig. 15 is an edge view partly in section of a portion of the jig and taken on the line 15—15 in Fig. 14.
Figure 16:
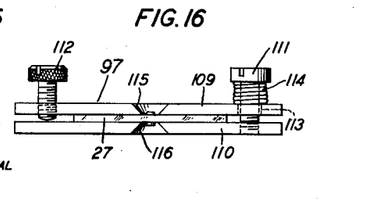
Fig. 16 is a side edge view of the jig shown in Fig. 14.

The crystal 27 as shown in Figs. 1, 2, 3, 4 and 5 is held in a jig 97 constructed as clearly shown in Figs. 14, 15 and 16 and this jig 97 is used in two operations, first in the operation of securing a plate 32 to the crystal 27, and, second, in the operation of attaching wires to the plates on the crystal 27. The jig 97, the structure of which will be subsequently described, is removably supported in a slide 98, shown in Figs. 1, 2 and 3, and which rests on the upper surface of the base 43 of the apparatus 42.

The slide 98 comprises a base block 99 supported on which and in spaced relation are two upright walls 100 and 101 secured by means of screws 102 to the base block 99. The walls 100 and 101 are grooved to receive edge portions of one of the plate-like parts of the jig 97. The base block 99 of the slide 98 has upwardly extending flanges 103—103 arranged to ride under and frictionally engage the overhangs 82 on the track bars 79 and 81. The slide 98 can be moved transversely with respect to the base 43 between the track bars 79 and 81 to bring the crystal 27 supported in the jig 97 to a required position relative to the heads 44 and 45. The micrometer-like stems 46 and 47 are of conventional structure and form and are supported in apertured brackets 104 and 105, respectively, which are secured by means of screws 106 to the base 43, the micrometer-like stems 46 and 47 being disposed about mid-way along the base 43 and being arranged to extend at right angles with respect to the heads 44 and 45 which extend lengthwise with respect to the base 43. The lengthwise movable shaft 107 in the micrometer-like stem 46 bears against one end of the slide 98 and the lengthwise movable shaft 108 in the micrometer-like stem 47 bears against the other end of the slide 98. By manual adjustment of the micrometer-like stems 46 and 47 the slide 98 can be moved back and forth as required on the base 43.

*Jig*

The jig 97, as shown in Figs. 14, 15 and 16, comprises apertured clamp plates 109 and 110 held in parallel relation by pairs of screws 111—111 and 112—112. Each screw 111—111 extends through an unthreaded aperture 113 in the clamp plate 109 and into threaded engagement with the clamp plate 110 and is supported in the clamp plate 110. A helical spring 114 is disposed between the head of the screw 111 and the outer surface of the clamp plate 109 to urge the clamp plate 109 towards the clamp plate 110. Each screw 112 extends through and in threaded engagement with the clamp plate 109 and into endwise bearing engagement with the clamp plate 110. The screws 111—111 are arranged diagonally on the jig 97 with respect to each other and the screws 112—112 are arranged diagonally with respect to each other.

A relatively long aperture 115 is formed in the clamp plate 109, the aperture 115 extending considerably more than half the distance across the plate 109 and opening to one edge portion of the plate 109. A relatively long aperture 116 is also formed in the clamp plate 110 and corresponds to and is in register with the aperture 115 in the clamp plate 109. The apertures 115 and 116 provide entrances through the jig 97 leading to a crystal 27 when the crystal 27 is held in the jig 97. To prepare the jig 97 for receiving the crystal, the screws 112—112 are suitably turned to move the clamp plates 109 and 110 apart a sufficient distance to accommodate the crystal, the distance being at least equal to the thickness of the crystal 27. The clamp plates 109 and 110 in moving apart do so against the action of the springs 114—114. After the crystal is inserted in the jig 97 to a predetermined position, the screws 112—112 are suitably turned so that the crystal 127 is clamped between the clamp plates 109 and 110 by action of the springs 114. After the crystal 27 has been clamped in the jig 97, the crystal and the jig 97 can be mounted in the slide 98 by inserting edge portions of the clamp plate 110 in grooves 117 and 118 formed in the upright walls 100 and 101, respectively, of the slide 98. Prior to the mounting of the jig 97 in the slide 98 the heads 44 and 45 can be tilted up from the position shown in Fig. 2 to the position shown in Fig. 3 to get the hollow arms 51 of the heads 44 and 45 out of the way of the jig 97 when the jig 97 is being placed in the slide 98. After the jig 97 has been placed in the slide 98, the crystal 27 and the jig 97 can be moved to a required position in the apparatus 42 by suitable manual operations of the micrometer-like stems 46 and 47. The heads 44 and 45 are subsequently swung downward to the position shown in Fig. 2.

In the position shown in Fig. 3, plates 32 to be subsequently secured to the crystal 27 can be readily inserted in the hollow arms 51 of the heads 44 and 45, the plate 32 after insertion in the hollow arm 51 being held in place by atmospheric pressure when air is being exhausted from the interior of the heads 44 and 45 by operation of the pneumatic suction apparatus (not shown) but which is in connection with the heads 44 and 45 by way of the hose 53 leading from the head 44 and the hose 119 leading from the head 45. When the heads 44 and 45 are in the position shown in Figs. 1 and 2, the pin type contacts 94 and 95 in the head 44 are in engagement with the respective fixed terminal plates 86 and 87 so that current can be supplied to the heating coil 92 in the head 44 by way of the respective conductors 88 and 89 in the paired lead 90. The pin type contacts 94 and 95 in the head 45 engage corresponding fixed terminal plates 86 and 87 supported below the head 45 and which are in electrical connection with the conductors 120 and 121, respectively fanned out from a paired lead 122 extending from the cable 91. Assuming that current is being supplied through the cable 91 and that the heads 44 and 45 are in the position shown in Figs. 1 and 2, the heating coil 92 in the head 44 is operating to heat the hollow arm 51 in that head and the heating coil 92 in the head 45 is operating to heat the hollow arm 51 in the head 45. Movement of the heads 44 and 45 to the position shown in Fig. 3 will disconnect the pin type terminals 94 and 95 from the respective fixed terminal plates 86 and 87 to cut off the supply of current to the heating coil 92.

As hereinbefore pointed out, the apparatus 42 provides an apparatus for equipping a crystal 27 with the plates 32 and 33 and another apparatus which will hereinafter be identified as the wire holding and attaching apparatus 123 provides an apparatus for equipping the crystal 27 with required wires. Subsequent to giving a description of the wire holding and attaching apparatus 123, I will describe in detail how the plates 32 and 33 are applied to the crystal 27 and how the wires are attached to the plates 32 and 33.

*Wire holding and attaching apparatus*

The wire holding and attaching apparatus 123 is constructed along the general lines of the plate holding and attaching apparatus 42 but with the exception that the heads in the wire holding and attaching apparatus are constructed to hold wires and apply wires to plates on the crystal. In the interest of shortening the description of the wire holding and attaching apparatus 123 parts therein which are identical with parts in the plate holding and attaching apparatus 42 are given the same identifying numbers in both descriptions and will be only briefly described or mentioned in the description of the wire holding and attaching apparatus 123.

Figure 17:
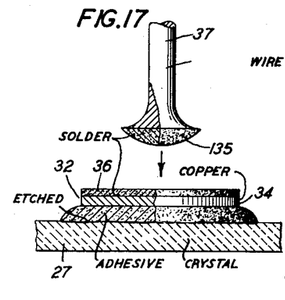
Fig. 17 is an enlarged view, partly in section, of a portion of a crystal with a plate attached and a portion of a wire ready for its securement to the plate.
Figure 18:
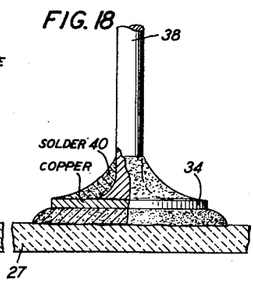
Fig. 18 shows the parts illustrated in Fig. 17 with the wire secured to the plate.

The wire holding and attaching apparatus 123 is operable to hold a wire 37 shown in Fig. 17, bring the wire 37 into engagement with a plate 32 on the crystal 27, heat the wire 37 and bring the heated wire 37 into engagement with the plate 32, in order to solder connect the wire 37 to the plate 32 to attain the structure shown in Fig. 18, in which the wire 37 becomes the wire 38 connected to the plate 34 by means of a body of solder 40.

Figure 11:
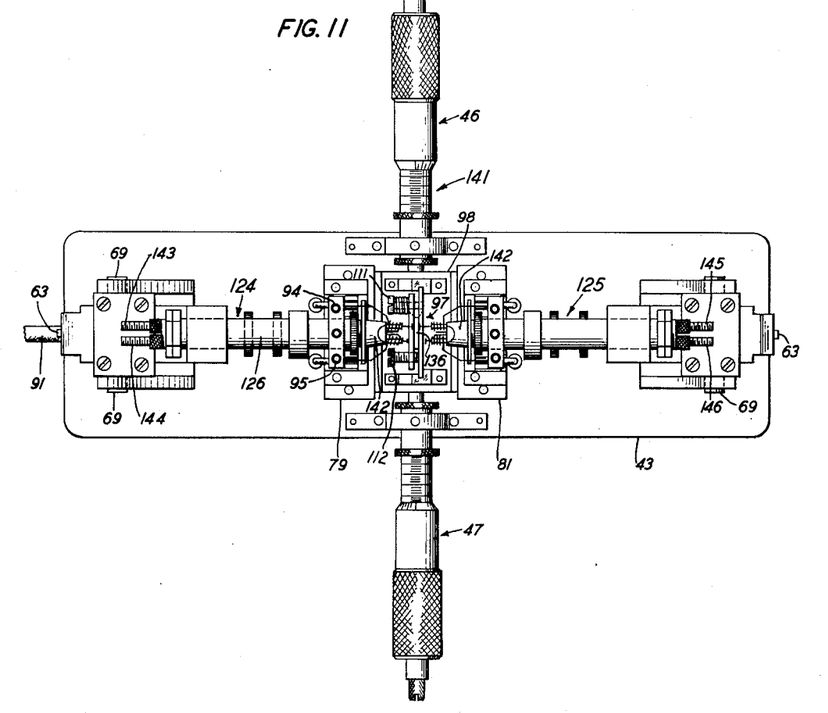
Fig. 11 is a top plan view of a modified form of the wire holding and attaching apparatus of the invention.
Figure 12:
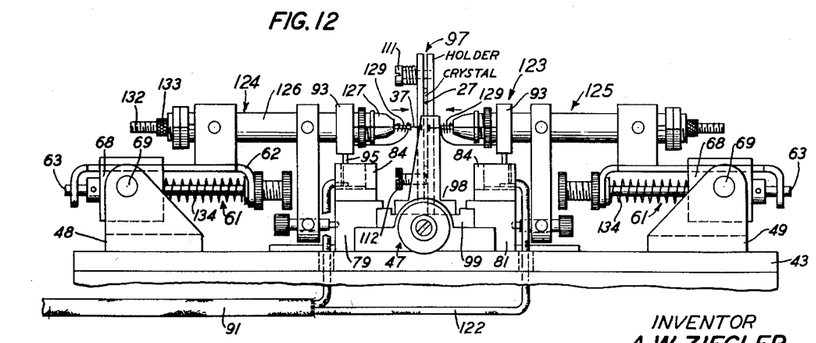
Fig. 12 is a front elevational view of the wire holding and attaching apparatus of the invention.
Figure 13:
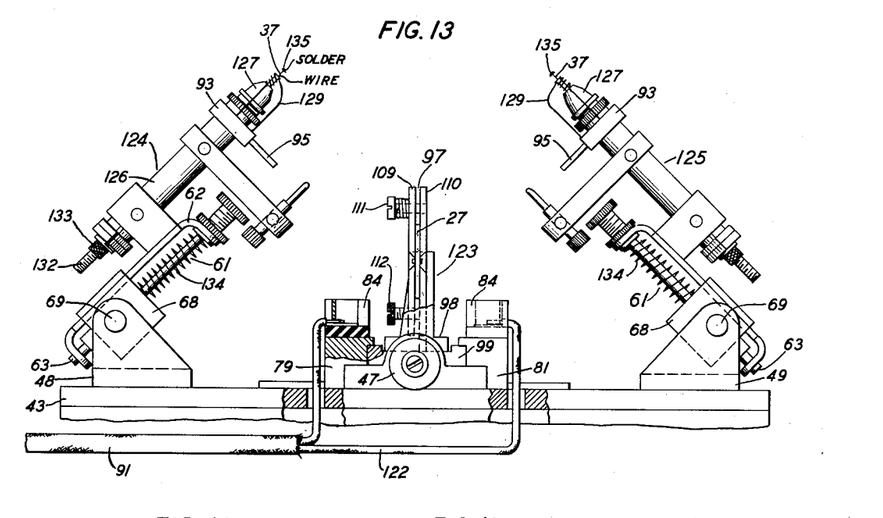
Fig. 13 is a view corresponding to Fig. 12 but with head members in the apparatus tilted to a different position.

The wire holding and attaching apparatus 123 as shown in Figs. 12 and 13 comprises a base 43, the micrometer-like stems 46 and 47, the supports 48 and 49, mountings 61—61, stems 63—63, grooved blocks 68—68, track bars 79 and 81, insulating blocks 84—84, terminal plates 86 and 87, terminal blocks 93—93, pin type contacts 94 and 95, slide 98, base block 99 and heating heads 124 and 125. The jig 97 shown in Figs. 14, 15 and 16 and previously described can be used in the wire holding and attaching apparatus 123 in the same manner as in the plate holding and attaching apparatus 42 and is shown in Figs. 11, 12 and 13 as supported in the slide 98.

The heating heads 124 and 125 in the apparatus 123 are alike in structure and as shown in Figs. 12 and 13, the heating head 124 comprises a tubular body 126 supported by a mounting 61 which has been previously described. Supported on one end of the tubular body 126 is a hollow tip 127 in which is secured a tubular needle 128 shown clearly in Figs. 20 and 21. The tubular needle 128 extends outwardly endwise from the hollow tip 127 and is surrounded by an electrically energizable heating coil 129 which when electrically energized will radiantly heat the tubular needle 128. The tubular needle 128 can be of a character and similar to a so-called hypodermic needle and is constructed to receive within its bore a major portion of the shank of the headed wire 37 shown in Fig. 17. When the headed wire 37 is suitably placed in the tubular needle 128 and the heating coil 129 is electrically energized, the headed wire 37 will be heated. Located within the bore of the tubular body 126 and extending into the bore of the tip 127 is a plunger 130 urged lengthwise by means of a spring 131, one end of which engages the plunger 130 while the other end engages an adjustment screw 132 which is screw threadedly supported in the body 126 and extends outwardly from the body to permit adjustment of the pressure of the spring 131 against the plunger 130. The adjustment screw 132 is equipped with a lock nut 133 to hold the adjustment screw 132 in adjusted position. When the headed wire 37 is inserted in the tubular needle 128, one end of the headed wire 37 bears against the spring pressed plunger 130 which presses the headed wire 37 against the plate 32 on the crystal 27 when the crystal 27 and the head 124 are in the positions shown in Fig. 12. The spring pressed plunger 130 will continue to urge the headed wire 37 toward the crystal 27 until the headed wire 37 comes into solder connection with the plate portion 34 of the plate 32 shown in Fig. 18. When the wire 37 is in solder connection with the plate 32, the supply of current to the heating coil 129 can be switched off by operation of a time switch (not shown) but in control of the supply of current of the heating coil 129. The solder will then cool so that the wire 37 will be secured to the plate 32. The head 124 can then be thrust away from the crystal 27 against the action of the spring 134 which normally urges the inverted U-shaped body 62 of the mounting 61 and the head 124 toward the position of the crystal 27. When the head 124 is moved away from the crystal 27 the tubular needle 128 will slide off the wire 38 and the head 124 can then be tilted to the position shown in Fig. 13.

*Description in detail of operations of the plate holding and attaching apparatus and the wire holding and attaching apparatus*

In equipping a crystal with the required wires in accordance with this invention, the crystal 27 etched as shown in Fig. 6 is placed in the jig 97 shown in Figs. 14, 15 and 16. The jig 97 with the crystal 27 therein is heated to a predetermined temperature in a suitable heating device (not shown).

The heads 44 and 45 of the apparatus 42 shown in Figs. 1 and 2 are tilted to the position shown in Fig. 3. The plate 32 is placed in the recess 96 in the hollow arm 51 of the head 44 so that the plate 32 closes one end of the bore in the hollow arm 51 and the adhesive coating 35 on the plate 32 is outside the recess 96. The plate 33 like the plate 32 is similarly placed in the recess 96 in the hollow arm 51 of the head 45. The pneumatic suction apparatus (not shown) but in communication with the heads 44 and 45 by way of the respective hose members 53 and 119 is turned on to exhaust air from the hollow arms 51 so that atmospheric pressure will hold the plates 32 and 33 in the hollow arms 51. The heated jig 97 with the crystal 27 therein is placed in the slide 98 in the position shown in Fig. 3 and the slide 98 is moved by means of the micrometer-like stems 46 and 47 to a required position on the base 43. The heads 44 and 45 are swung downward from the position shown in Fig. 3 to the position shown in Fig. 2. In this position the pin type contacts 94 and 95 engage the fix terminal plates 86 and 87 respectively to allow electric current to flow to the heating coils 92—92. The hollow arms 51—51 of the heads 44 and 45 are therefore heated and the plates 32 and 33 are heated to somewhat soften and render tacky the adhesive coating 35 on each plate 32 and 33. The movable pipes 52—52 in the heads 44 and 45 are manually thrust toward the crystal 27 against the action of the springs 54 until the adhesive coated surfaces of the plates 32 and 33 engage the heated crystal 27 as shown in Fig. 5. The pressure on the pipes 52—52 can be continued until the adhesive coatings on the plates 32 and 33 slightly spread over portions of the crystal 27 as shown in Fig. 10. The pressure on the pipes 52—52 is then released to allow the hollow arms 51—51 to move away from the position of the crystal 27 under the action of the springs 54—54, to leave the plates 32 and 33 on the crystal 27, the adhesive coatings on the plates being sufficiently tacky to overcome the atmospheric pressure formerly holding the plates in the hollow arms 51. The heads 44 and 45 can then be swung upward to the position shown in Fig. 3 in which position the heating coils 92 are no longer energized since the pin type contacts 94 and 95 are out of engagement with the respective terminal plates 86 and 87. The adhesive coatings on the plates 32 and 33 upon hardening will securely hold the plates 32 and 33 on the crystal 27.

After the plates 32 and 33 are attached to the crystal 27, the heated jig 97 with the crystal therein is removed from the apparatus 42 and transferred to the apparatus 123 shown in Figs. 12 and 13, the heads 124 and 125 being in the position shown in Fig. 13. With the heads 124 and 125 in this position, a headed wire 37 shown in Fig. 17 is placed in each tip 127 with the solder coating 135 on the headed end of the wire 37 disposed outwardly of the tip 127. A small amount of soldering flux is applied to the headed end of each wire. By means of the micrometer-like stems 46 and 47, the slide 98 in the apparatus 123 is moved to position the crystal in the jig 97 as required to receive the headed wires to be attached to the plates on the crystal. The heads 124 and 125 of the apparatus 123 are then swung downward from the position shown in Fig. 13 to the position shown in Fig. 12. In this position, the heads 124 and 125 are urged by the springs 134 in the mountings 61 towards the crystal in the jig 97 and by reason of the spring pressed plungers 130 in the heads 124 and 125, the wires 37 are urged against the plates on the crystal and so that the solder coating 135 on each wire is pressed against a solder coating 36 on a plate 32 or 33 as the case may be.

In the position shown in Fig. 12 the heating coils 129 in the heads 124 and 125 are energized since the pin type contacts 94 and 95 are in engagement with the respective fixed terminal plates 86 and 87 supplied with electrical current by way of the cable 91. The headed wires supported in the heads 124 and 125 are therefore heated to melt the solder coating 135 on each headed wire and the solder coating 36 on each plate while the wires are being thrust by means of the spring pressed plungers 130 toward the crystal. Under the heat and pressure applied to the headed wires, the solder coating 135 on each wire and the solder coating 36 on an engaged plate 32, for instance, unite and the molten solder moves for the most part back of the head on the wire to form as shown in Fig. 18 the frusto-conical body of solder 40 serving when cool to secure the wire to the plate. The solder can be allowed to cool cutting off the current supplied to the cable 91 by means of a switch (not shown) but in control of the supply of current to the cable 91.

As shown in Fig. 21, the headed wires 37 and 38 are solder connected to the respective plates 32 and 33 on the crystal 27. Under this condition the heads 124 and 125 can be subsequently manually thrust away from the wires and crystal against the action of the springs 134 in the mountings 61 and the heads 124 and 125 with no headed wires therein can be restored to the position shown in Fig. 13. When the heads 124 and 125 are manually moved lengthwise away from the crystal 27, the tubular needles 128 in the heads 124 and 125 slide off the wires attached to the crystal.

In the position shown in Fig. 13, the jig 97 with the crystal therein, can be removed from the slide 98 in the apparatus 123. The crystal 27 with its attached lead wires 38 and 39, shown in Fig. 23, can then be taken out of the jig 97, the screws 112 in the jig 97 being operated to force the clamp plates 109 and 110 apart against the action of the springs 114.

After the crystal equipped with the wires 38 and 39 has been removed from the jig 97, the metal coatings 41 are applied to major flat surfaces of the crystal, to form the finished crystal shown in Fig. 26. The metal coating 41 extends over a major flat surface of the crystal and also over edge portions of the adhesive layer and the plate and is continued over the frusto-conical body of solder 40. The kind of material used in the metal coating and the method of application are matters of choice but could for instance be a coating of gold applied by an evaporation process to the crystal.

Figure 22:
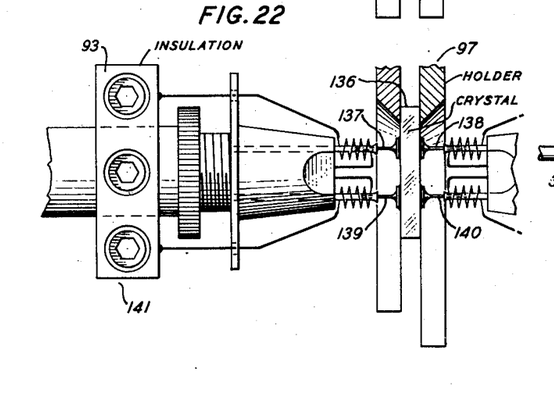
Fig. 22 is an enlarged view, partly in section, of portions of the heads shown in the apparatus illustrated in Fig. 11 and operated to equip a crystal with four wires.

In Figs. 22, 24 and 25, a crystal 136 is equipped with lead wires 137, 138, 139 and 140. The crystal 136 has been equipped with the lead wires 137, 138, 139 and 140 in the same manner as the crystal 27 is equipped with the lead wires 38 and 39. In equipping the crystal 136 with the four lead wires 137, 138, 139 and 140, it is found advantageous to use the apparatus 141 shown in Fig. 11.

The apparatus 141 shown in Fig. 11 is a modification of the wire holding and attaching apparatus 123 shown in Figs. 12 and 13 and already described, the difference being that in the apparatus 141 shown in Fig. 11, the tips 142—142 are each constructed to hold two wires instead of one. Two tubular needles instead of one are provided in each tip and two heating coils are provided on each tip to radiantly heat the tubular needles. Two spring pressed plungers are also provided in each head 124 and 125 to urge the wires against plates attached to the crystal. The pressure of the spring pressed plungers can be regulated by adjusting the adjustment screws 143, 144, 145 and 146 supported in the heads 124 and 125 and corresponding to the adjustment screw 132 shown in Fig. 12.

I have found that when a crystal is in a predetermined heated condition and is equipped with four plates secured to the crystal by means of adhesive in the same manner as shown in Fig. 10, I can by using the apparatus 141 shown in Fig. 11 simultaneously equip the crystal with the four lead wires 137, 138, 139 and 140, shown in Fig. 24, without fracturing the crystal 136.

After the four lead wires are secured in place on the crystal 136, the metal coatings 147, 148, 149 and 150 can be applied, each of the metal coatings extending over a required part of the crystal and over portions of the wire connection shown.

Although the crystal has been shown and described as having an etched surface it has been found unnecessary in some cases to etch the crystal and that wires can be attached to the unetched crystal in accordance with the invention.

What is claimed is:

1. A plate holding and attaching apparatus for equipping a crystal with an adhesively coated plate comprising a support for the crystal, a movable tubular head operable to move toward and away from the crystal, a tubular arm supported in said head and operable to hold the adhesively coated plate and bring the adhesively coated plate into engagement with the crystal, a pneumatic suction line extending to said tubular head and in communication with said tubular arm and operable to condition said tubular arm for lightly holding the adhesively coated plate and a heater coil extending around said tubular arm and operable to heat said tubular arm and the adhesively coated plate supported thereby during the operation of moving the adhesively coated plate into engagement with the crystal.

2. A plate holding and attaching apparatus for equipping a crystal with an adhesively coated plate comprising a support for the crystal, a movable tubular head operable to move toward and away from the crystal, a tubular arm operable to move lengthwise in said tubular head and constructed to hold the adhesively coated plate in engagement with the crystal, a pneumatic suction line extending into said tubular head and in communication with said tubular arm and operable to condition said tubular arm for lightly holding the adhesively coated plate in said tubular arm, an electrically energizable heater coil extending around said tubular arm and operable to heat said tubular arm and the adhesively coated plate supported therein, spaced terminal plates in electrical connection with a source of current supply for said heater coil and spaced contacts carried by said movable tubular head and operable to engage said spaced terminal plates and transmit electrical current to said heater coil when said movable tubular head and said tubular arm are moved into a position for bringing the adhesively coated plate into engagement with the crystal.

3. A plate holding and attaching apparatus for equipping a crystal with adhesively coated plates comprising a base, support means on said base to support the crystal in a required position, a pair of tiltable and lengthwise movable heads supported on said base and operable to move toward and away from the crystal, arms extending from and movably supported in said heads and operable to pneumatically hold the adhesively coated plates in engagement with the crystal and heater coils on said heads and operable to heat said arms and the adhesively coated plates when the adhesively coated plates are being applied to the crystal.

4. A plate holding and attaching apparatus for equipping a crystal with adhesively coated plates comprising a base, a pair of tiltable and lengthwise movable heads mounted on said base and movable toward and away from each other, a slide movably supported on said base and between the positions of said heads, a jig supporting the crystal and mounted in said slide, arms supported in said heads and operable to move lengthwise of said heads, said arms being operable to support the adhesively coated plates and bring the plates into engagement with the crystal and electrically energizable heater coils on said arms and operable to heat said arms and the adhesively coated plates supported therein when the adhesively coated plates in said arms are being brought by means of said arms into engagement with the crystal.

5. A wire holding and attaching apparatus for equipping a plate equipped crystal with a wire comprising a support for the plate equipped crystal, a movable head operable to move toward and away from the crystal, a tubular needle supported in said movable head and operable to support a wire for attachment to the plate on the crystal by means of solder material disposed between the wire supported in said tubular needle and the plate on the crystal and a heater extending around said tubular needle and operable to heat said tubular needle and the wire supported therein and reduce the solder between the wire and the plate on the crystal to a molten condition when the wire is brought into engagement with the plate on the crystal.

6. A wire holding and attaching apparatus for equipping a plate equipped crystal with a wire comprising a support for the plate equipped crystal, a movable tubular head operable to move toward and away from the crystal, a tubular needle supported in and extending from said head and in communication with the bore of said tubular head, said tubular needle being operable to receive and support a wire to be attached to the plate on the crystal, a heater coil extending around said tubular needle and operable to heat said tubular needle and the wire supported therein and a spring pressed plunger in said head and operable to urge the wire supported in said tubular needle outwardly and against the plate on the crystal.

7. A wire holding and attaching apparatus for attaching wires to plates on a crystal comprising a base, a movable support on said base for supporting the crystal, fixed supports on said base, a pair of mountings tiltably supported on said fixed supports, lengthwise movable arms in said mountings, a pair of tubular heads mounted on said lengthwise movable arms and operable to move toward and away from the crystal, a tubular needle supported in each head and extending therefrom and in communication with the bore in each head, each of said tubular needles being operable to support a solder tipped wire to be attached to a plate on the crystal, a spring pressed plunger in each head and operable to urge the wire in the tubular needle against a plate on the crystal and so that the solder tip on the wire is against the plate on the crystal and a heater coil encircling each tubular needle and operable to heat the tubular needle and the wire supported therein while the solder tip on the wire is against the plate on the crystal.

8. A wire holding and attaching apparatus for attaching wires to plates on a crystal comprising a base, a support on said base for the crystal, a pair of tiltable and longitudinally movable heads mounted on said base and operable to move toward and away from the crystal, a pair of tubular needles mounted on and extending from said heads and operable to support a pair of wires in position for securement to plates on the crystal by means of solder, solder material on the plates on the crystal and heater coils surrounding said tubular needles and operable to heat said tubular needles, the wires therein and the the solder material on the plates when the wires supported in said tubular needles are in bearing engagement with the plates on the crystal.

9. A wire holding and attaching apparatus for equipping a plate equipped crystal with wires comprising a support for the plate equipped crystal, a movable tubular head operable to move toward and away from the crystal, a plurality of tubular needles supported in and extending from said head and in communication with the bore of said tubular head, said tubular needles being operable to receive and support wires to be attached to plates on the crystal, heater coils extending around said tubular needles and operable to heat said tubular needles and the wires supported therein and spring pressed plungers in said head and operable to urge the wires supported in said tubular needles outwardly and against the plates on the crystal.

10. An apparatus for equipping a crystal with cooperating elements comprising a base, a support for the crystal positioned on said base, a movable head mounted from said base operable to move toward and away from the crystal, a hollow arm supported in said movable head and operable to hold the cooperating element in engagement with the crystal, and a heater encompassing said arm to radiantly heat said arm and said cooperating element supported thereby during the operation of moving the cooperating element against the crystal.

11. An apparatus for equipping a crystal with a cooperating element comprising a support for the crystal, a movable tubular head operable to move toward and away from the crystal, a tubular arm operable to move lengthwise in said tubular head and to hold the cooperating element in engagement with the crystal, an electrically energizable heater coil extending around said tubular arm and operable to heat said tubular arm and the cooperating element supported thereby, spaced terminal plates in electrical connection with a source of current supply for said heater coil, and spaced contacts carried by said movable tubular head and operable to engage said spaced terminal plates and transmit electrical current to said heater coil when said tubular head and said tubular arm are moved into a position for bringing the cooperating element into engagement with the crystal.

12. An apparatus for equipping a crystal with cooperating elements comprising a base, a pair of tiltable and lengthwise movable heads mounted on said base and movable toward and away from each other, a slide movably supported on said base and between the positions of said heads, means supporting the crystal and mounted in said slide, arms supported in said heads and operable to move lengthwise of said heads, said arms being operable to support the cooperating elements and bring the elements into engagement with the crystal, and electrically energizable heater coils on said arms and operable to heat said arms and the cooperating elements supported thereby when the cooperating elements in said arms are being brought by means of said arms into engagement with the crystal.

13. A plate holding and attaching apparatus for equipping a crystal with an adhesively coated plate comprising a support for the crystal, a movable head operable to move toward and away from the crystal, an arm supported in said movable head, pneumatic means cooperating with said arm to hold the adhesively coated plate in engagement with the crystal, and heater means extending around said arm and operable to radiantly heat said arm and the adhesive coated plate supported thereby during the operation of moving the adhesively coated plate against the crystal.

14. A heating head for apparatus for equipping crystals with cooperating elements comprising a hollow arm, pneumatic means holding the cooperating element in said arm, and means for heating said cooperating element in said arm, said second means comprising a heating coil extending around said arm and operable to radiantly heat said arm.

15. An apparatus for equipping a crystal with a cooperating element comprising a base member, a support for the crystal mounted on said base member, a movable tubular head operable to move towards or away from the crystal, means rotatably mounting said head from said base for motion in a plane perpendicular to said base, a tubular arm in said tubular head and operable to hold the cooperating element in engagement with the crystal, an electrically energizable heating coil extending around said tubular arm and operable to radiantly heat said arm and the cooperating element supported thereby, electrical contact means carried by said movable tubular head and connected to said coil, and cooperating electrical contact means mounted by said base in electrical connection with a source of current supply for said heater coil, current being transmitted through said cooperating contact means to said coil when said tubular head and said tubular arm are rotated into a position parallel to said base for bringing the cooperating element into engagement with the crystal.

16. An apparatus for equipping a crystal with a cooperating element in accordance with claim 15, wherein said cooperating element is an adhesively coated plate and comprising pneumatic means connected to said tubular arm cooperating to hold the adhesively coated plate in engagement with the crystal.

17. An apparatus for equipping a crystal with a cooperating element in accordance with claim 15, wherein said cooperating element is a wire for attachment to a plate secured to the crystal and said tubular arm is a needle having an extended aperture into which the wire extends and by which it is held in engagement with the crystal.

18. An apparatus for equipping a crystal with a cooperating element comprising a base, a hollow head mounted from said base and movable longitudinally toward or away from the crystal, a hollow arm supported in said hollow head and operable to hold the cooperating element in engagement with the crystal, means cooperating with said hollow head to move said cooperating element towards the crystal, said means including a spring, and an electrically energizable heater coil extending around said hollow arm to radiantly heat said arm and said cooperating element supported thereby.

19. An apparatus for equipping a crystal with a cooperating element in accordance with claim 18, wherein the cooperating element is a wire for attachment to a plate adhesively secured to the crystal and said hollow arm is a needle having an extended aperture therein into which the wire extends and by which it is held against the crystal.

ARTHUR W. ZIEGLER.

REFERENCES CITED

The following references are of record in the file of this patent:

UNITED STATES PATENTS

| Number | Name | Date |
| --- | --- | --- |
| 934,538 | Johnson | Sept. 21, 1909 |
| 1,407,722 | Braun | Feb. 28, 1922 |
| 1,435,470 | Hosford | Nov. 14, 1922 |
| 1,749,700 | Fourment | Mar. 4, 1930 |
| 1,886,257 | Brisbois | Nov. 1, 1932 |

FOREIGN PATENTS

| Number | Country | Date |
| --- | --- | --- |
| 282,346 | Great Britain | Nov. 29, 1928 |